3,474,093
ENAMINE ADDUCTS OF N-ACYLOXY-N-
ACYLAMINOACETANILIDE
Ronald J. McCauily, Malvern, and Stanley C. Bell, Philadelphia, Pa., assignors to American Home Products Corporation, New York, N.Y., a corporation of Delaware
No Drawing. Filed May 3, 1966, Ser. No. 547,175
Int. Cl. C07d 87/46, 29/34, 27/04
U.S. Cl. 260—247.1                                    7 Claims

ABSTRACT OF THE DISCLOSURE

T8he disclosure is directed to pyrrolidinone, indolinone, cycloheptapyrrolone, and cyclopentapyrrolone adducts of N-acyloxy-N-acylaminoacetanilides and to a method for their preparation.

This invention relates to new and useful enamine adducts of N-acyloxy-N-acylaminoacetanilides as well as to the novel method for their preparation. In particular, the present invention is concerned with pyrrolidinones, indolinones, cycloheptapyrrolones, and cyclopentapyrrolones having pharmacological activity.

The novel compounds which are included within the scope of this invetnion are represented by the following formula:

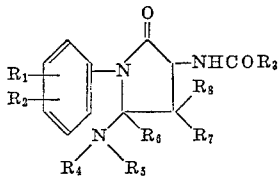

wherein $R_1$ and $R_2$ are both selected from the group consisting of hydrogen, halogen, sulfamoyl, benzoyl, lower alkyl and lower alkoxy; $R_3$ is selected from the group consisting of phenyl and lower alkyl; $R_4$ and $R_5$ when taken separately are lower alkyl and when taken together with the nitrogen atom to which they are attached form a ring selected from the group consisting of morpholino, piperidino and pyrrolidino; $R_6$ and $R_7$ when taken separately are selected from the group consisting of hydrogen and lower alkyl and when concatenated form a ring selected from the group consisting of pentamethylene, hexamethylene and heptamethylene; and $R_8$ is selected from the group consisting of hydrogen and lower alkyl with the proviso that $R_8$ is lower alkyl when $R_7$ is hydrogen.

The new compounds represented by the aforesaid structural formula, in which $R_6$ and $R_7$ are taken separately, properly are called: "pyrrolidinones." Typical examples thereof are 3-acetamido-1-(p-chlorophenyl)-4,4-dimethyl-5-dimethylamino - 2 - pyrrolidinone; 3-acetamido-4-ethyl-4 - methyl - 1 - phenyl-5-dipropylamino-2-pyrrolidinone and 3-acetamido-1-(p-propylphenyl) - 5 - (1-pyrrolidinyl)-2-pyrrolidinone. Those compounds of the aforesaid structural formula, wherein $R_6$ and $R_7$ are concatenated to form a pentamethylene ring are called: "cyclopentapyrrolones," for example, 3 - acetamido-3,3a,4,5,6,6a-hexahydro-1-(p-iodophenyl)-6a-morpholinocyclopenta[b]pyrrol - 2[1H]-one and 3-benzamido-3,3a,4,5,6,6a-hexahydro - 6a - dimethylamino-1-phenylcyclopenta[b]pyrrol - 2[1H] - one. When $R_6$ and $R_7$ are concatenated to form a hexamethylene ring in the above structural formula, they are named: "indolinones," such as: 3-acetamido-1-(p-chlorophenyl)-3a,4,5,6,7,7a - hexahydro - 7a - (1 - pyrrolidinyl)-2-indolinone and 3-acetamido - 1 - (2 - benzoyl-4-chlorophenyl)-3a,4,5,6,7,7a-hexahydro - 7a - (1-pyrrolidinyl)-2-indolinone. Alternatively, when $R_6$ and $R_7$ are concatenated to form a heptamethylene ring, the compounds represented by the above formula are called: "cycloheptapyrrolones," examples thereof are 3 - acetamido-1-(p-bromophenyl)-3,3a,4,5,6,7,8,8a-octahydro - 8a - (1 - pyrrolidinyl)-cyclohepta[b]pyrrol - 2[1H] - one and 1-(3,4-diethylphenyl)-8a-morpholino - 3,3a,4,5,6,7,8,8a - octahydro-3-valeramidocylohepta[b]pyrrol-2[1H]-one.

In accord with the process aspects of the present invention, the novel compounds of this invention are prepared by the process generally illustrated by the following equation:

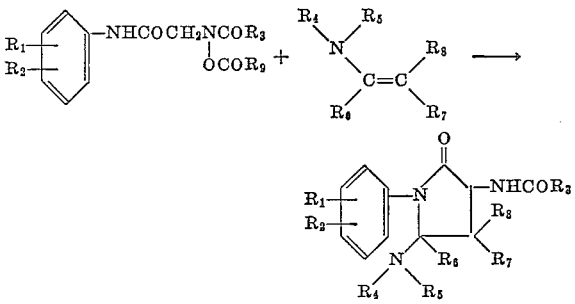

wherein $R_1$, $R_2$, $R_3$, $R_4$, $R_5$, $R_6$, $R_7$ and $R_8$ are defined as above and $R_9$ is lower alkyl. The reaction is effected by admixing with stirring a N-acyloxy-N-acylaminoacetanilide with at least two equivalents of base of which at least one equivalent is a basic enamine in a reaction-inert organic solvent at a temperature from about 25° C. to about 80° C. for a period of from about one-half hour to about sixteen hours. By reaction-inert organic solvent as employed herein is meant an organic solvent which will dissolve the reactants but does not react with them under the above described reaction conditions. Many such solvents will suggest themselves to those skilled in the art, in this regard, excellent results can be obtained with 1,2-dimethoxyethane, tetrahydrofuran, dioxane and ether. It should be noted that when one of the aforesaid reactants is a liquid, this reaction may be conducted by admixture of the starting materials, under the above described conditions, without the use of a reaction-inert organic solvent.

After the reaction is complete, the product is separated by standard recovery procedures, for example, crystalline products may be otbained by filtration or decantation while oily products may be isolated by acid extraction.

Many of the basic enamine reactants employed in the above described process to prepare the novel compounds of this invention are known compounds which are readily available from commecrial sources, while the remainder can easily be prepared in accordance with standard organic procedures well known to those skilled in the art. The N-acyloxy-N-acylaminoacetanilide reactants may be prepared by the procedure described in copending U.S. Patent application, Ser. No. 456,533, "Acetamides and their Preparation," filed on May 17, 1965 by Bell et al., now Patent No. 3,382,243.

In accord with the present invention, the new compounds of the present invention have been found to possess interesting pharmaceutical properties which render them useful as synthetic medicinals. More particularly, these compounds, in standard pharmacological tests, have exhibited utility as hyperemic depressants, anti-convulsants and antiarrythmic agents.

When the compounds of this invention are employed as hyperemic depressants, anti-convulsants and antiarrythmic agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention when administered orally are most desirably administered at a concentration level that will generally afford effective results without causing any harmful or deleterious side effects and preferably at a level that is in the range of from about 10 mg. to about 200 mg. per day, although as aforementioned variations will occur. Alternatively, when these compounds are administered parenterally, a dosage level that is in the range of from about 5 mg. to about 75 mg. per day is employed.

The following examples are given by way of illustration and are not to be construed as limitations of this invention, many variations of which are possible without departing from the scope and spirit thereof.

EXAMPLE I

1 - (N - pyrrolidino) - 1 - cyclohexene (3.02 g., 20.0 mmole) in 30 ml. of dry 1,2-dimethoxyethane is heated with stirring at 55–60° C. in a nitrogen atmosphere and treated gradually with a slurry of 2.84 g. (10.0 mmole) of 2-[acetyl(hydroxy)amino]-4'-chloroacetanilide, acetate in 20 ml. of dimethoxyethane. The mixture is stirred at 57° C. for one hour, allowed to cool, and then chilled in ice. Filtration of the crystals yields 2.41 g. of product which is recrystallized from acetonitrile to obtain 3 - acetamido-1-(4-chlorophenyl)-3a,4,5,6,7,7a-hexahydro-7a-(1-pyrrolidinyl)-2-indolinone M.P. 217–219° C.

Analysis.—Calcd. for $C_{20}H_{26}ClN_3O_2$: C, 63.92; H, 6.98; Cl, 9.44; N, 11.18. Found: C, 63.77; H, 6.83; Cl, 9.65; N, 10.87.

In a similar manner, 1-(N-morpholino)-1-cyclohexene is reacted with 2-[acetyl(hydroxy)amino]-4' sulfamoylacetanilide, acetate to yield 3-acetamido-7a-(1-morpholinyl) - 3a,4,5,6,7,7a-hexahydro-1-(4-sulfamoylphenyl)-2-indolinone.

EXAMPLE II 1-(N-piperidino)-1-cyclohexene (10.0 mmole) in 20 ml. of tetrahydrofuran is heated with stirring at 45° C., under argon and then treated with (5.0 mmole) 2-[acetyl (hydroxy)amino]-3'-methylacetanilide, acetate in 20 ml. of tetrahydrofuran. The mixture is heated to 80° C. for one-half hour, cooled and then chilled to 0° C. The product is separated by filtration and is 3-acetamido-3a,4,5,6, 7,7a - hexahydro - 7a - (1 - piperidinyl) - 1 - (3 - tolyl) - 2-indolinone.

Similarly, 1 - (3,4 - dichlorophenyl) - 3a,4,5,6,7,7a-hexahydro - 3 - propionamido - 7a - (1 - pyrrolidinyl) - 2-indolinone is prepared.

EXAMPLE III 1-(N-pyrrolidino)-1-cycloheptene (20.0 mmole) in 30 ml. of dry 1,2-dimethoxyethane is heated with stirring at 50° C., under nitrogen, and admixed with 2-[acetyl(hydroxy)amino]-3'-bromoacetanilide, acetate (10.0 mmole) in 20 ml. of dry 1,2-dimethoxyethane. The reaction mixture is maintained at this temperature for one hour with stirring and then cooled. The product is separated by filtration and is 3-acetamido-1-(3-bromophenyl)-3,3a,4,5,6, 7,8,8a - octahydro - 8a - (1 - pyrrolidinyl)cyclohepta[b] pyrrol-2[1H]-one.

In the same manner, 1-(3,4-diethylphenyl)-8a-morpholino - 3,3a,4,5,6,7,8,8a - octahydro - 3 - valeramidocyclohepta[b]pyrrol-2[1H]-one and 3-acetamido-1-(2,5-diethoxyphenyl) - 8a - morpholino - 3,3a,4,5,6,7,8,8a-octahydrocyclohepta[b]pyrrol-2[1H]-one are obtained.

EXAMPLE IV 1-(N-morpholino)-1-cyclopentene (10.0 mmole) in 20 ml. of dioxane is heated to 60° C. and slowly admixed with 2-[acetyl(hydroxy)amino]-4'-iodoacetanilide, acetate (5.0 mmole) in 10 ml. of dioxane. The reaction mixture is then stirred at room temperature for sixteen hours. Thereafter, the resulting 3 - acetamido - 3,3a,4,5,6,6a-hexahydro-1-(4-iodophenyl) - 6a - morpholinocyclopenta[b]pyrrol-2[1H]-one is obtained by filtration.

Similarly, 3 - benzamido - 3,3a,4,5,6,6a - hexahydro-6a-dimethylamino - 1 - phenylcyclopenta[b]pyrrol - 2[1H]-one is produced.

EXAMPLE V 1-(N-pyrrolidino)-1-cyclohexene (9.1 g., 63.6 mmole) in 50 ml. of dry 1,2-dimethoxyethane is stirred, heated at 55° C., and treated with a slurry of 11.6 g. (30.0 mmole) 2-[acetyl(hydroxy)amino]-2'-benzoyl-4'-chloroacetanilide, acetate in 150 ml. of dry 1,2-dimethoxyethane. The resulting solution is warmed at 60° C. for three hours and the solvent evaporated in vacuo to give an oily residue. The oily residue is dissolved in dilute hydrochloric acid, extracted with ether; the aqueous acidic phase is basified with dilute sodium hydroxide solution and then extracted with several portions of ether. The ether extract is dried over anhydrous potassium carbonate and evaporated to give an amber oil. Treatment of the oil with hot cyclohexene causes a portion of the oil to dissolve and another portion to separate as a solid (M.P. 182–184° C.). Upon cooling, 1.6 g. of crystalline material (M.P. 163–167° C.) separates from the cyclohexene. Recrystallization of both crystalline portions give the same crystalline material, 3-acetamido - 1 - (2-benzoyl-4-chlorophenyl) - 3a,4,5,6,7,7a-hexahydro - 7a - (1 - pyrrolidinyl)-2-indolinone, M.P. 183–185° C.

Analysis.—Calcd. for $C_{21}H_{30}ClN_3O_3$: C, 67.56; H, 6.30; Cl, 7.38; N, 8.75. Found: C, 67.91; H, 6.41; Cl, 7.75; N, 8.85.

EXAMPLE VI

2 - [acetyl-(hydroxy)amino] - 4' - chloroacetanilide, acetate (4.26 g., 15.0 mmole) is added to 50 ml. of N,N-dimethylisobutenylamine at 65° C. The mixture is heated at 65° C. for 2.5 hours under a nitrogen atmosphere. The excess isobutenylamine is evaporated in vacuo and the residue is crystallized from methanol-water to yield 2.30 g. of 3 - acetamido - 1 - (4 - chlorophenyl)-4,4-dimethyl-5-dimethylamino-2-pyrrolidinone, M.P. 157–159° C.

Analysis.—Calcd. for $C_{16}H_{22}ClN_3O_2$: C, 59.34; H, 6.85; Cl, 10.95; N, 12.98. Found: C, 59.02; H, 6.70; Cl, 10.9; N, 13.11.

EXAMPLE VII

Employing the procedure of Example VI to react the appropriate N - acyloxy - N - acylaminoacetanilide with a basic enamine, the hereinafter listed pyrrolidinones are produced:

3-acetamido-4-ethyl-4-methyl-1-phenyl-5-dipropylamino-2-pyrrolidinone;

4,5-dimethyl-5-dimethylamino-1-(4-methoxyphenyl)-3-propionamido-2-pyrrolidinone;

3-acetamido-4-methyl-1-(4-propylphenyl)-5-(1-pyrrolidinyl)-2-pyrrolidinone;

3-acetamido-5-(1-morpholinyl)-1-phenyl-4-propyl-2-pyrrolidinone;

3-acetamido-4,5-diethyl-5-methylethylamino-1-(3,4-dimethoxyphenyl)-2-pyrrolidinone;

3-benzamido-1-(3,4-dibromophenyl)4,4,5-triethyl-5-diethylamino-2-pyrrolidinone; and 3-acetamido-4-butyl-1-(2-iodophenyl)-5-dipropylamino-2-pyrrolidinone.

What is claimed is:

1. A compound selected from the group consisting of those having the formula:

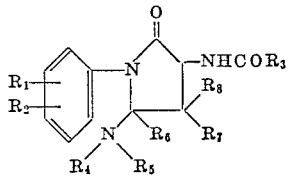

wherein $R_1$ and $R_2$ are both selected from the group consisting of hydrogen, halogen, sulfamoyl, benzoyl, methyl, ethyl, propyl, methoxy and ethoxy; $R_3$ is selected from the group consisting of phenyl and alkyl having 1 to 4 carbons; $R_4$ and $R_5$ when taken separately are alkyl having 1 to 3 carbons and when taken together with the nitrogen atom to which they are attached form a ring selected from the group consisting of morpholino, piperidino and pyrrolidino; $R_6$ and $R_7$ when taken separately are selected from the group consisting of hydrogen, methyl and ethyl and when concatenated form a ring selected from the group consisting of pentamethylene, hexamethylene and heptamethylene; and $R_8$ is selected from the group consisting of hydrogen and alkyl having from 1 to 4 carbon atoms with the proviso that when $R_7$ is hydrogen $R_8$ is alkyl.

2. A compound as described in claim 1 which is: 3-acetamido-1-(4-chlorophenyl)-3a,4,5,6,7,7a - hexahydro-7a-(pyrrolidino)-2-indolinone.

3. A compound as described in claim 1 which is: 3-acetamido-1-(2-benzoyl-4-chlorophenyl) - 3a,4,5,6,7,7a - hexahydro-7a-(pyrrolidino)-2-indolinone.

4. A compound as described in claim 1 which is: 3-acetamido-1-(4-chlorophenyl)-4,4-dimethyl - 5 - dimethylamino-2-pyrrolidinone.

5. A compound as described in claim 1 which is: 3-acetamido-3a,4,5,6,7,7a-hexahydro-7a - (piperidino) - 1-(3-tolyl)-2-indolinone.

6. A compound as described in claim 1 which is: 3-acetamido-1-(4-bromophenyl) - 3,3a,4,5,6,7,8,8a - octahydro-8a-(pyrrolidino)cyclohepta [b]pyrrol-2[1H]-one.

7. A process for the production of a compound of the formula:

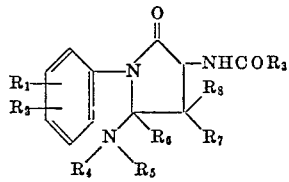

wherein $R_1$ and $R_2$ are both selected from the group consisting of hydrogen, halogen, sulfamoyl, benzoyl, methyl, ethyl, propyl, methoxy and ethoxy; $R_3$ is selected from the group consisting of phenyl and alkyl having 1 to 4 carbons; $R_4$ and $R_5$ when taken separately are alkyl having 1 to 3 carbons and when taken together with the nitrogen atom to which they are attached form a ring selected from the group consisting of morpholino, piperidino and pyrrolidino; $R_6$ and $R_7$ when taken separately are selected from the group consisting of hydrogen, methyl and ethyl and when concatenated form a ring selected from the group consisting of pentamethylene, hexamethylene and heptamethylene; and $R_8$ is selected from the group consisting of hydrogen and alkyl having from 1 to 4 carbon atoms with the proviso that when $R_7$ is hydrogen $R_8$ is alkyl, which comprises:

(a) reacting a N-acyloxy-N-acylaminoacetanilide of the formula:

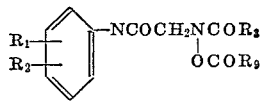

wherein $R_1$, $R_2$ and $R_3$ are defined as above, and $R_9$ is alkyl having 1 to 4 carbons;

(b) with an enamine of the formula:

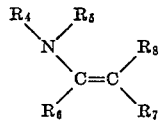

wherein $R_4$, $R_5$, $R_6$, $R_7$ and $R_8$ are defined as above;

(c) at a temperature that is in the range from about 25° C. to about 80° C. for a period of from about one-half hour to about sixteen hours.

No references cited.

ALEX MAZEL, Primary Examiner
JOSE TOVAR, Assistant Examiner

U.S. Cl. X.R.

260—247.2, 293.4, 294, 326.3; 424—248, 267, 274